United States Patent
Chen et al.

(10) Patent No.: US 12,068,683 B2
(45) Date of Patent: Aug. 20, 2024

(54) CONTROLLER OF SWITCHING POWER SUPPLY AND CONTROL METHOD THEREOF

(71) Applicant: Silergy Semiconductor Technology (Hangzhou) LTD, Hangzhou (CN)

(72) Inventors: Zhan Chen, Hangzhou (CN); Jian Deng, Hangzhou (CN); Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 291 days.

(21) Appl. No.: 17/585,758

(22) Filed: Jan. 27, 2022

(65) Prior Publication Data
US 2022/0255439 A1  Aug. 11, 2022

(30) Foreign Application Priority Data
Feb. 5, 2021 (CN) .......................... 202110159939.2

(51) Int. Cl.
*H02M 1/44* (2007.01)
*H02M 3/335* (2006.01)
*H02M 1/00* (2006.01)

(52) U.S. Cl.
CPC ......... *H02M 1/44* (2013.01); *H02M 3/33507* (2013.01); *H02M 1/0032* (2021.05)

(58) Field of Classification Search
CPC ..... H02M 1/0032; H02M 1/0048; H02M 1/44
See application file for complete search history.

(56) References Cited

U.S. PATENT DOCUMENTS

| | | | |
|---|---|---|---|
| 7,227,277 B2 | 6/2007 | Chapman et al. | |
| 7,256,568 B2 | 8/2007 | Lam et al. | |
| 8,310,846 B2 | 11/2012 | Piazzesi | |
| 8,853,888 B2 | 10/2014 | Khaligh | |
| 9,130,460 B2 | 9/2015 | Sun et al. | |
| 9,257,916 B2 | 2/2016 | Cheng et al. | |
| 9,543,822 B2 | 1/2017 | Hang et al. | |
| 9,559,591 B2 | 1/2017 | Hang et al. | |
| 10,218,263 B2 * | 2/2019 | Saint-Pierre | H02M 3/33507 |
| 2007/0052397 A1 | 3/2007 | Thompson et al. | |
| 2008/0231115 A1 | 9/2008 | Cho et al. | |
| 2008/0258688 A1 | 10/2008 | Hussain et al. | |
| 2011/0110126 A1 * | 5/2011 | Morrish | H02M 1/143 |
| | | | 363/21.18 |
| 2012/0153729 A1 | 6/2012 | Song et al. | |
| 2012/0194162 A1 * | 8/2012 | Lin | H02M 1/14 |
| | | | 323/304 |
| 2013/0063180 A1 | 3/2013 | Sun et al. | |
| 2015/0078045 A1 | 3/2015 | Zhang et al. | |
| 2016/0211745 A1 | 7/2016 | Hang et al. | |

(Continued)

FOREIGN PATENT DOCUMENTS

CN  107359789 B  11/2017

*Primary Examiner* — Alex Torres-Rivera

(57) ABSTRACT

A controller of a switching power supply can include: a frequency-jittering control circuit configured to generate a first frequency-jittering signal and a second frequency-jittering signal; where a jittering range of an operating frequency of a power transistor in the switching power supply is adjusted by the first frequency-jittering signal; and where a jittering amplitude of a peak value of an inductor current of the switching power supply is adjusted by the second frequency-jittering signal.

18 Claims, 5 Drawing Sheets

(56) References Cited

U.S. PATENT DOCUMENTS

| | | |
|---|---|---|
| 2017/0063238 A1 | 3/2017 | Hang et al. |
| 2017/0279279 A1 | 9/2017 | Shimada et al. |
| 2018/0198361 A1 | 7/2018 | Seong et al. |
| 2018/0351464 A1* | 12/2018 | Finkel ................ H02M 3/33507 |
| 2021/0190391 A1* | 6/2021 | Kayano ................... F25B 21/00 |

* cited by examiner

CONTROLLER OF SWITCHING POWER SUPPLY AND CONTROL METHOD THEREOF

RELATED APPLICATIONS

This application claims the benefit of Chinese Patent Application No. 20211015999.2, filed on Feb. 5, 2021, which is incorporated herein by reference in its entirety.

FIELD OF THE INVENTION

The present invention generally relates to the field of power electronics, and more particularly to control circuits and associated switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as to not unnecessarily obscure aspects of the present invention.

A switching power supply usually produces serious electromagnetic interference (EMI) due to fast switching of power transistors in operation. It is a common concern in industry to reduce EMI as required by some standards of the power supply. One approach to reduce EMI of the switching power supply is to add an EMI filter into the circuit. However, this approach can increase the cost and size of the power supply, deteriorate high-frequency performance, and increase power consumption. The frequency jittering control is an effective method for suppressing conducted EMI, and has been widely used in some low-power switching power supplies. This approach changes an operating frequency of the switching power supply periodically or non-periodically in a range, such that harmonic interference energy is dispersed and the EMI standards are met.

However, frequency jittering control in the switching power supply may be based on the principle of changing a system switching frequency of the switching power supply. Although it can suppress conducted EMI, the power transistor may not be turned on at idea moment due to variation of the system switching frequency in some cases. The frequency jittering control may lead to higher conduction loss, lower system efficiency, and higher heat dissipation. Moreover, because the power transistor is turned on and off at a high voltage in this approach, additional electromagnetic radiation may occur, which can result in degradation of EMI. Thus, it is desirable to further improve the frequency jittering control in a switching power supply, in order to reduce conduction loss and suppress electromagnetic radiation of the power transistor.

Figure 1:
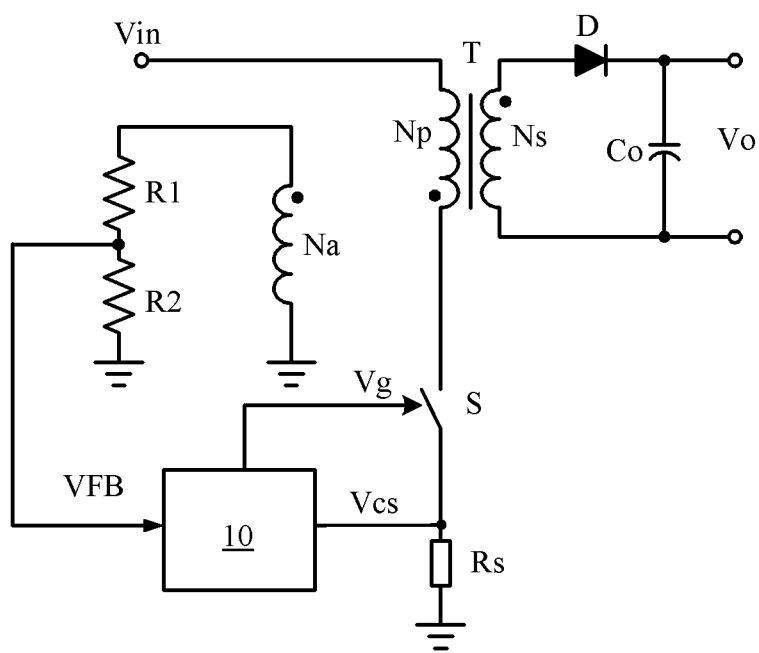
FIG. 1 is a schematic diagram of an example switching power supply.

Referring now to FIG. 1, shown is a schematic diagram of an example switching power supply. In this example, the switching converter is a flyback switching power supply, including transformer T. Transformer T can include primary winding Np, secondary winding Ns, and auxiliary winding Na configured to transfer power energy and feedback a signal. At the primary side, an external AC input signal after rectified and filtered can be configured as input voltage Vin. A first terminal of primary winding Np of transformer T can receive input voltage Vin, and power transistor S and sampling resistor Rs can connect in series between a second terminal of primary winding Np of transformer T and the ground. At the secondary side, a first terminal of secondary winding Ns of transformer T can connect to diode D, capacitor Co can connect in parallel between a cathode of diode D and the ground, and output voltage Vo can be generated at both terminals of capacitor Co.

A first terminal of auxiliary winding Na of transformer T can be configured as a feedback terminal, and a second terminal of auxiliary winding Na can be grounded. Resistors R1 and R2 may form a voltage divider network, and voltage feedback signal $V_{FB}$ representative of output voltage Vo at the secondary side can be obtained from the first terminal of auxiliary winding Na. A voltage feedback circuit can obtain voltage feedback signal $V_{FB}$ from auxiliary winding Na of transformer T. Controller 10 can obtain inductor current sampling signal Vcs representative of a current flowing through primary winding Np from sampling resistor Rs, and obtain voltage feedback signal $V_{FB}$ of the secondary voltage at secondary winding Ns from the voltage feedback circuit. Controller 10 can generate switching control signal Vg according to inductor current sampling signal Vcs and voltage feedback signal $V_{FB}$, thereby controlling the switching state of power transistor S.

For example, switching control signal Vg can be configured as a pulse-width modulation (PWM) signal with a duty cycle, such that power transistor S can be switched between an on state and an off state. Here, it should be understood that some embodiments may only provide a solution for obtaining inductor current sampling signal Vcs and voltage feedback signal $V_{FB}$. In other embodiments, other possible methods may be adopted to obtain the sampling or feedback signal in the circuit. When power transistor S is turned on, primary winding Np of transformer T can bear input voltage Vin, and primary inductor current IL rises linearly from zero. When inductor current sampling signal Vcs generated across sampling resistor Rs reaches feedback control signal Vcomp, power transistor S can be turned off. Here, feedback control signal Vcomp may represent a limit value of the primary inductor current at the primary side.

In one embodiment, feedback control signal Vcomp can characterize an error between voltage feedback signal $V_{FB}$ representative of the output voltage at the secondary side and a reference voltage. When power transistor S is turned off, a freewheeling current can flow through secondary diode D, the secondary winding may have a negative voltage Vo, and primary inductor current IL can decrease linearly. In the quasi-resonant mode, power transistor S can be turned on again at a valley of its source-drain voltage. In the quasi-resonant mode, feedback control signal Vcomp can determine a conduction time of power transistor S and the freewheeling current duration of secondary diode D. That is, feedback control signal Vcomp can determine the switching frequency of power transistor S.

Figure 2:
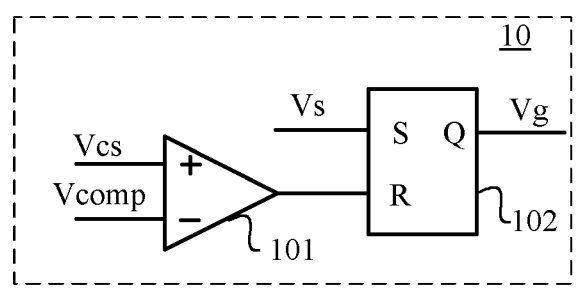
FIG. 2 is a schematic diagram of a first example controller of a switching power supply.

Referring now to FIG. 2, shown is a schematic diagram of a first example controller of a switching power supply. This example controller 10 can include comparator 101 and RS flip-flop 102. A non-inverting input terminal of comparator 101 can receive inductor current sampling signal Vcs, and an inverting input terminal of comparator 101 can receive feedback control signal Vcomp. An output terminal of comparator 101 can provide a turn-off signal. Set terminal S of RS flip-flop 102 can receive a turn-on signal, reset terminal R can receive the turn-off signal, and output terminal Q of RS flip-flop 102 can generate switching control signal Vg. During the conduction period of power transistor S, inductor current sampling signal Vcs can linearly rise. When inductor current sampling signal Vcs reaches feedback control signal Vcomp, the turn-off signal may have a high level, and the signal at output terminal Q of RS flip-flop 102 may have a low level. After power transistor S is turned off, when the turn-on signal has a high level again, the RS flip-flop can provide switching control signal Vg with a high-level, such that power transistor S can be turned on again. Then, the next switching period can begin.

Figure 3:
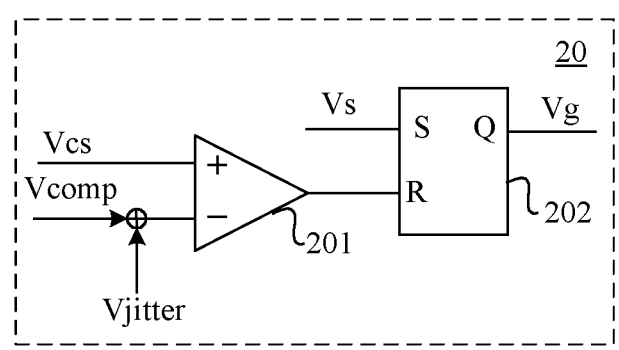
FIG. 3 is a schematic diagram of a second example controller with frequency-jittering control of a switching power supply.

Referring now to FIG. 3, shown is a schematic diagram of a second example controller with frequency-jittering control of a switching power supply. In one example frequency-jittering control, by adding frequency-jittering signal Vjitter to feedback control signal Vcomp to change the amplitude of feedback control signal Vcomp, the switching frequency can be changed, thereby realizing the frequency jittering control. However, the switching power supply can produce electromagnetic interference when operating at a fixed frequency, and the conducted interference can mainly be concentrated in the frequency points of 1, 2, and 3 times switching frequency. When the switching frequency is very fixed, the energy at the 1, 2, and 3 times frequency points can be very concentrated. In the conduction test, the spikes at the above-mentioned frequency points may be very high, and a stronger filter circuit must be adopted in order to meet the electromagnetic compatibility requirements.

In one frequency-jittering control method, the amplitude of frequency jittering signal Vjitter is fixed at, e.g., 30%-100% load. In this way, this approach has two disadvantages: one is at 30%-50% load, frequency jittering control can cause larger ripples; second, when at 25% and 10% loads no frequency jittering control may be involved, which can lead to conduction interference that may not be optimized. In another frequency jitter control method, the amplitude of frequency jittering signal Vjitter can be determined according to the load condition. That is, the amplitude of the frequency jittering signal can be relatively large under heavy load, and the amplitude of the frequency jittering signal relatively small under light load. This approach also has two disadvantages: one is that the amplitude of the frequency jittering signal at light load is small, which can cause poor frequency jittering effect; second, at 25% and 10% loads, no frequency jittering may be involved, which can lead to conduction interference that may not be optimized.

In order to solve the above-mentioned problems, particular embodiments utilize a new frequency jittering control method. When the load is between no load to a preset threshold (e.g., 10%-30% light load), a jittering-frequency control circuit in the controller of the switching power supply can generate a first frequency jittering signal and a second frequency jittering signal. A jittering range of an operating frequency of a power transistor in the switching power supply can be adjusted by the first frequency-jittering signal, and a jittering amplitude of a peak value of an inductor current of the switching power supply may be adjusted by the second frequency-jittering signal. Further, a change tendency of the operating frequency can be opposite to that of the peak value of the inductor current, such that the output power of the switching power supply is not affected by the jittering of the operating frequency.

Figure 4:
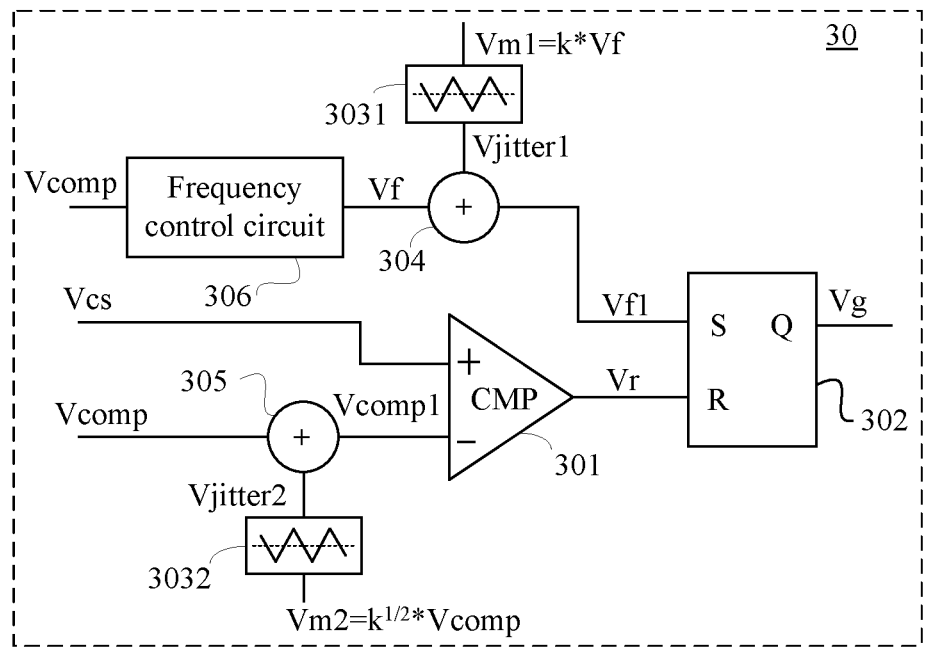
FIG. 4 is a schematic diagram of a first example controller of a switching power supply, in accordance with the embodiments of the present invention.

Referring now to FIG. 4, shown is a schematic diagram of a first example controller of a switching power supply, in accordance with the embodiments of the present invention. This example controller 30 can include comparator 301, RS flip-flop 302, frequency jittering control circuit 303, superimposing circuit 304, superimposing circuit 305, and frequency control circuit 306. Frequency jittering control circuit 303 can include frequency jittering signal generating circuits 3031 and 3032, which are respectively configured to generate frequency jittering signals Vjitter1 and Vjitter2. Here, frequency jittering signal Vjitter1 can adjust the jittering range of the operating frequency of power transistor S of the switching power supply to vary within a first range determined by threshold V1. That is, the upper limit of the operating frequency to the lower limit of the operating frequency is threshold V1. Frequency jittering signal Vjitter2 can adjust the jittering amplitude of the peak value of the inductor current of the switching power supply to vary within a second range determined by threshold V2. That is, the upper limit of the peak value of the inductor current to the lower limit of the peak value of the inductor current is threshold V2. Here, threshold V2 can be the square root of threshold V1; that is, $V2=V1^{1/2}$.

Further, the change tendency of the operating frequency is opposite to the change tendency of the peak value of the inductor current. When the jittering range of the operating frequency of power transistor S is adjusted to be increased within an upper limit of the first range by frequency jittering signal Vjitter1, the jittering amplitude of the peak value of the inductor current of the switching power supply can be adjusted to be decreased within the lower limit of the second range by frequency jittering signal Vjitter2. On the contrary, when the jittering range of the operating frequency of power transistor S is adjusted to be decreased within the lower limit of the first range by frequency jittering signal Vjitter1, the jittering amplitude of the peak value of the inductor current of the switching power supply can be adjusted to be increased within the upper limit of the second range by frequency jittering signal Vjitter2. In one embodiment, the operating frequency of power transistor S of the switching power supply can be adjusted by regulating the jittering amplitude of frequency control signal Vf representative of the operating frequency, and the peak value of the inductor current can be adjusted by adjusting feedback control signal Vcomp.

In one embodiment, frequency jittering signal Vjitter1 can be generated according to the product of frequency control signal Vf representative of the operating frequency and proportional coefficient K1, and frequency jittering signal Vjitter2 can be generated according to the product of feedback control signal Vcomp and proportional coefficient K2. Here for example, proportional coefficient K2 is the square root of proportional coefficient K1; that is, $K2=K1^{1/2}$. In this embodiment, frequency control signal Vf characterizing the operating frequency can be generated according to feedback control signal Vcomp. Also, feedback control signal Vcomp and the frequency control signal Vf may have a predetermined relationship (e.g., a linear relationship, the relationship of the same change tendency, or the discrete one-to-one correspondence, etc.), or any other relationship which needs to be able to adaptively adjust frequency control signal Vf according to feedback control signal Vcomp. In particular embodiments, frequency control circuit 306 can be configured to generate frequency control signal Vf according to feedback control signal Vcomp. It should be understood that frequency control signal Vf may also be a clock signal, or other signal(s) representing the operating frequency of the power transistor of the switching power supply.

In one embodiment, frequency jittering signal generating circuit 3031 can generate intermediate signal Vm1 according to the product of frequency control signal Vf and proportional coefficient K1, and may generate frequency jittering signal Vjitter1 having a peak-to-peak value of intermediate signal Vm1 according to intermediate signal Vm1. Frequency jittering signal generating circuit 3032 can generate intermediate signal Vm2 according to the product of feedback control signal Vcomp and proportional coefficient K2, and may generate frequency jittering signal Vjitter2 having a peak-to-peak value of intermediate signal Vm2 according to intermediate signal Vm2. In this embodiment, the phase of frequency jittering signal Vjitter1 can be opposite to the phase of frequency jittering signal Vjitter2. When frequency jittering signal Vjitter1 is a positive value, frequency jittering signal Vjitter2 can be a negative value. On the contrary, when frequency jittering signal Vjitter1 is a negative value, frequency jittering signal Vjitter2 may be a positive value.

For example, frequency jittering signals Vjitter1 and Vjitter2 are triangular wave signals, and the amplitudes of frequency jittering signals Vjitter1 and Vjitter2 refer to the peak-to-peak value of the triangular wave signal. In other embodiments, frequency jittering signals Vjitter1 and Vjitter2 can also be sine wave signals, and need not be limited to the triangular wave signals as shown, as long as the peak-to-peak values thereof satisfy the above relationship. In one embodiment, the value of frequency jittering signal Vjitter1 can vary between $-\frac{1}{2}$ Vm1~$\frac{1}{2}$ Vm1, and frequency jittering signal Vjitter2 can vary between $-\frac{1}{2}$ Vm2~$\frac{1}{2}$ Vm2. In other embodiments, the value of frequency jittering signal Vjitter1 may also vary between 0~+Vm1 or 0~−Vm1, and the value of frequency jittering signal Vjitter2 may also vary between 0~+Vm2 or 0~−Vm2.

In particular embodiments, superposing circuit 304 can superimpose frequency jittering signal Vjitter1 on frequency control signal Vf to generate superposing signal Vf1, and controller 30 can generate switching control signal Vg for controlling power transistor S to be turned on according to superposition signal Vf1. Also, superposing circuit 305 can superimpose frequency jittering signal Vjitter2 on feedback control signal Vcomp to generate superposing signal Vcomp1, and controller 30 can generate switching control signal Vg for controlling power transistor S to be turned off according to comparison result Vr of inductor current sampling signal Vcs and superposing signal Vcomp1. In this way, the phase of the frequency jittering signal Vjitter2 can be opposite to the phase of frequency jittering signal Vjitter1, such that the change tendency of the operating frequency is opposite to that of the peak value of the inductor current, and the output power is not affected by the jittering of the operating frequency. In addition, the peak value of the inductor current can be adjusted by adjusting feedback control signal Vcomp, such that superposing circuit 305 may superimpose frequency jittering signal Vjitter2 on feedback control signal Vcomp. In particular embodiments, the peak value of the inductor current can be adjusted by adjusting inductor current sampling signal Vcs.

Thus, superposing circuit 305 can superimpose frequency jittering signal Vjitter2 on inductor current sampling signal Vcs. In one embodiment, comparator 301 can compare superposing signal Vcomp1 against inductor current sampling signal Vcs, and may generate a valid comparison result Vr when inductor current sampling signal Vcs rises to superposing signal Vcomp1. Then, RS flip-flop 302 can generate switching control signal Vg to control power transistor S in the switching power supply to be turned off. A non-inverting input terminal of comparator 301 can receive inductor current sampling signal Vcs, an inverting input terminal of comparator 301 can receive superposing signal Vcomp1, and an output terminal of comparator 301 may provide comparison result Vr. Set terminal S of RS flip-flop 302 can receive superposing signal Vf1, reset terminal R of RS flip-flop 302 can receive comparison result Vr, and output terminal Q of RS flip-flop 302 may generate switching control signal Vg.

In particular embodiments, the jittering range of the operating frequency of the switching transistor of the switching power supply can match with the jittering amplitude of the peak value of the inductor current by frequency jittering control circuit 303. Also, the change tendency of the jittering range of the operating frequency may be opposite to the jittering amplitude of the peak value of the inductor current, such that the output power of the switching power supply may not be affected by the jittering of the operating frequency. The operating principle of frequency jittering control circuit 303 is further analyzed as follows. In one embodiment, when the load of the switching power supply is light, pulse-frequency modulation (PFM) control can be adopted, and the feedback loop may determine the operating frequency. When input voltage Vin, output voltage Vo, and load current Io are fixed, the operating frequency of power transistor S can be fixed. The calculation Formula 1 of output power Pout can be as follows:

$$Pout = \frac{1}{2} * Lp * (Ipk)^2 * Freq \qquad (1)$$

Among them, Lp is the inductance of primary winding Np, Freq is the operating frequency, and Ipk is the peak value of the inductor current. When the jittering range of operating frequency Freq is K1, the jittering amplitude of Ipk(Vcs) is $K2=K1^{1/2}$. The jittering range of the operating frequency of the switching transistor of the switching power supply can match with the jittering amplitude of the peak value of the inductor current by frequency jittering control circuit 303. Also, the change tendency of the jittering range of the operating frequency is opposite to the jittering amplitude of the peak value of the inductor current, such that the output power of the switching power supply may not be affected by the jittering of the operating frequency.

Figure 5:
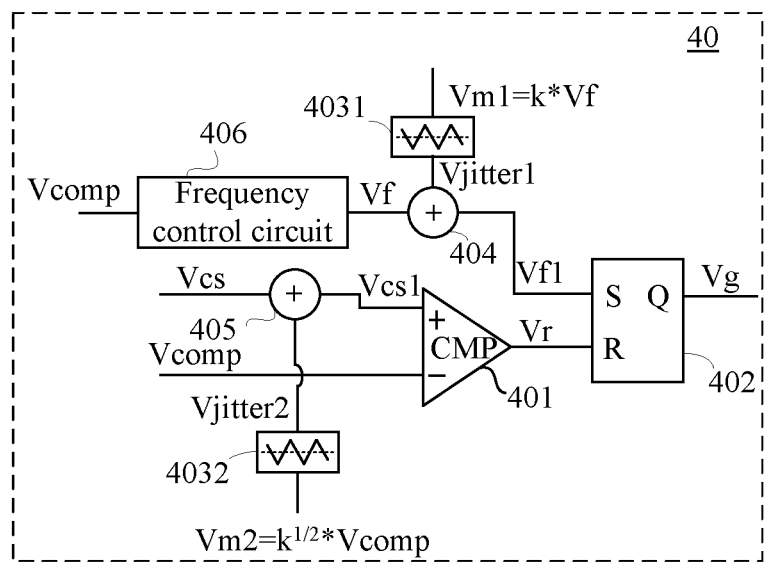
FIG. 5 is a schematic diagram of a first example control circuit, in accordance with the embodiments of the present invention.

Referring now to FIG. 5, shown is a schematic diagram of a second example controller of a switching power supply, in accordance with the embodiments of the present invention. This example controller 40 can include comparator 401, an RS flip-flop 402, frequency jittering control circuit 403, superposing circuit 404, superposing circuit 405, and frequency control circuit 406. Among them, the structures and operating principles of RS flip-flop 402, frequency jitter control circuit 403, superposition circuit 404, and frequency control circuit 406 may respectively be the same as those of RS flip-flop 302, frequency jitter control circuit 303, superposition circuit 304, and frequency control circuit 306 discussed above. In this particular example, the adjustment of the peak value of the inductor current can be realized by adjusting inductor current sampling signal Vcs. Therefore, superposition circuit 405 can superimpose frequency jittering signal Vjitter2 on inductor current sampling signal Vcs, in order to generate superposing signal Vcs1. Also, controller 40 can generate switching control signal Vg for turning off power transistor S according to comparison result Vr of superposing signal Vcs1 and feedback control signal Vcomp.

Comparator 401 can compare superposing signal Vcs1 against feedback control signal Vcomp, and may generate a valid comparison result Vr. When superposing signal Vcs1 rises to the level of feedback control signal Vcomp, RS flip-flop 402 can generate switching control signal Vg for controlling power transistor S in the switching power supply to be turned off. A non-inverting input terminal of comparator 401 can receive superposing signal Vcs1, an inverting input terminal of comparator 401 can receive feedback control signal Vcomp, and an output terminal of comparator 401 may generate comparison result Vr. Set terminal S of RS flip-flop 402 can receive superposing signal Vf1, reset terminal R of RS flip-flop 402 can receive comparison result Vr, and the output terminal Q of RS flip-flop 402 may generate switching control signal Vg.

Particular embodiments may also provide a control method, whereby the jittering range of the operating frequency of the switching transistor of the switching power supply can match the jittering amplitude of the peak value of the inductor current, and the change tendency of the jittering range of the operating frequency can be opposite to the jittering amplitude of the peak value of the inductor current, such that the output power of the switching power supply is not affected by the jittering of the operating frequency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A controller of a switching power supply, the controller comprising:
 a) a frequency-jittering control circuit configured to generate a first frequency-jittering signal and a second frequency-jittering signal;
 b) wherein a jittering range of an operating frequency of a power transistor in the switching power supply is adjusted by the first frequency-jittering signal;
 c) wherein a jittering amplitude of a peak value of an inductor current of the switching power supply is adjusted by the second frequency-jittering signal; and
 d) wherein the frequency-jittering control circuit is enabled when a load is between no load and a preset load, such that the output power of the switching power supply is not affected by the jittering of the operating frequency.

2. The controller according to claim 1, wherein a change tendency of the operating frequency is opposite to a change tendency of the peak value of the inductor current.

3. The controller according to claim 1, wherein:
 a) the jittering range of the operating frequency of a power transistor of the switching power supply is adjusted by the first frequency jittering signal to be varied within a first range determined by a first threshold;
 b) the peak value of the inductor current is adjusted by the second frequency-jittering signal to be varied within a second range determined by a second threshold; and
 c) the second threshold is the square root of the first threshold.

4. The controller according to claim 1, wherein:
 a) the first frequency jittering signal is generated according to a product of a frequency control signal representative of the operating frequency and a first proportional coefficient;
 b) the second frequency jittering signal is generated according to a product of a feedback control signal and a second proportional coefficient; and
 c) the second proportional coefficient is the square root of the first proportional coefficient.

5. The controller according to claim 4, further comprising a frequency control circuit configured to generate the frequency control signal having a preset relationship in accordance with the feedback control signal.

6. The controller according to claim 1, wherein:
 a) the first frequency jittering signal is superposed on a frequency control signal representative of the operating frequency to generate a first superposing signal; and
 b) a switching control signal for controlling the power transistor to be turned on is generated in accordance with the first superposing signal.

7. The controller according to claim 6, wherein:
 a) the second frequency jittering signal is superimposed on a feedback control signal to generate a second superposing signal; and
 b) the switching control signal for controlling the power transistor to be turned off is generated by comparing the second superposing signal against an inductor current sampling signal.

8. The controller according to claim 6, wherein:
 a) the second frequency jittering signal is superimposed on an inductor current sampling signal to generate a second superposing signal; and
 b) the switching control signal for controlling the power transistor to be turned off is generated by comparing the second superposing signal against a feedback control signal.

9. The controller according to claim 1, wherein the frequency-jittering control circuit comprises:
 a) a first frequency jittering signal generating circuit configured to generate a first intermediate signal according to a product of a frequency control signal representative of the operating frequency and a first proportional coefficient, and to generate the first frequency jittering signal having a peak-to-peak value of the first intermediate signal according to the first intermediate signal; and b) a second frequency jittering signal generating circuit configured to generate a second intermediate signal according to a product of a feedback control signal and a second proportional coefficient, and to generate the second frequency jittering signal having a peak-to-peak value of the second intermediate signal according to the second intermediate signal.

10. The controller according to claim 1, wherein:
a) the controller is configured to generate a switching control signal for controlling the power transistor in accordance with the first frequency-jittering signal, the second frequency-jittering signal, an inductor current sampling signal and a feedback control signal; and
b) the feedback control signal characterizes an error between a voltage feedback signal representative of an output voltage and a reference voltage.

11. The controller according to claim 1, wherein the first and second frequency-jittering signals are one of a triangular wave and a sinusoidal wave.

12. A controller of a switching power supply, the controller comprising:
a) a frequency-jittering control circuit configured to generate a first frequency-jittering signal and a second frequency-jittering signal;
b) wherein a jittering range of an operating frequency of a power transistor in the switching power supply is adjusted by the first frequency-jittering signal;
c) wherein a jittering amplitude of a peak value of an inductor current of the switching power supply is adjusted by the second frequency-jittering signal; and
d) wherein a phase of the first frequency jittering signal is opposite to a phase of the second frequency jittering signal.

13. A method of controlling a switching power supply, the method comprising:
a) generating a first frequency-jittering signal and a second frequency-jittering signal;
b) adjusting a jittering range of an operating frequency of a power transistor in the switching power supply by the first frequency-jittering signal;
c) adjusting a jittering amplitude of a peak value of an inductor current of the switching power supply by the second frequency-jittering signal; and
d) wherein the jittering range of the operating frequency of a power transistor of the switching power supply is adjusted by the first frequency jittering signal to be varied within a first range determined by a first threshold, the peak value of the inductor current is adjusted by the second frequency-jittering signal to be varied within a second range determined by a second threshold, and the second threshold is the square root of the first threshold.

14. The method according to claim 13, wherein a change tendency of the operating frequency is opposite to a change tendency of the peak value of the inductor current.

15. The method according to claim 13, wherein:
a) the first frequency jittering signal is generated according to a product of a frequency control signal representative of the operating frequency and a first proportional coefficient;
b) the second frequency jittering signal is generated according to a product of a feedback control signal and a second proportional coefficient;
c) the second proportional coefficient is the square root of the first proportional coefficient; and
d) the feedback control signal characterizes an error between a voltage feedback signal representative of an output voltage and a reference voltage.

16. The method according to claim 13, wherein:
a) a switching control signal for controlling the power transistor is generated in accordance with the first frequency-jittering signal, the second frequency-jittering signal, an inductor current sampling signal, and a feedback control signal; and
b) the feedback control signal characterizes an error between a voltage feedback signal representative of an output voltage and a reference voltage.

17. The method according to claim 13, further comprising:
a) generating a first intermediate signal according to a product of a frequency control signal representative of the operating frequency and a first proportional coefficient;
b) generating the first frequency jittering signal having a peak-to-peak value of the first intermediate signal according to the first intermediate signal;
c) generating a second intermediate signal according to a product of a feedback control signal and a second proportional coefficient; and
d) generating the second frequency jittering signal having a peak-to-peak value of the second intermediate signal according to the second intermediate signal.

18. The method according to claim 17, further comprising generating the frequency control signal having a preset relationship in accordance with a feedback control signal, wherein the feedback control signal characterizes an error between a voltage feedback signal representative of an output voltage and a reference voltage.

* * * * *